(12) United States Patent
Bryan et al.

(10) Patent No.: US 10,553,235 B2
(45) Date of Patent: Feb. 4, 2020

(54) TRANSPARENT NEAR-END USER CONTROL OVER FAR-END SPEECH ENHANCEMENT PROCESSING

(71) Applicant: Apple Inc., Cupertino, CA (US)

(72) Inventors: Nicholas J. Bryan, San Francisco, CA (US); Vasu Iyengar, Pleasanton, CA (US); Aram M. Lindahl, Menlo Park, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/256,587

(22) Filed: Jan. 24, 2019

(65) Prior Publication Data

US 2019/0156847 A1    May 23, 2019

Related U.S. Application Data

(63) Continuation-in-part of application No. 15/688,455, filed on Aug. 28, 2017, now abandoned.

(51) Int. Cl.
  *G10L 21/028* (2013.01)
  *G10L 21/02* (2013.01)
  *G10L 21/0232* (2013.01)
  *G10L 17/00* (2013.01)

(52) U.S. Cl.
  CPC ........ *G10L 21/0205* (2013.01); *G10L 17/005* (2013.01); *G10L 21/028* (2013.01); *G10L 21/0232* (2013.01)

(58) Field of Classification Search
  CPC ......... G06F 3/16; G10L 17/005; G10L 21/02; G10L 21/0205; G10L 21/0208; G10L 21/0232; G10L 21/028; G10L 21/0272; G10L 2021/02082; H04B 10/25; H04M 1/725; H04M 3/00; H04M 2201/40; H04R 1/02; H04R 9/08; H04W 4/12
  USPC ............... 370/248; 379/347, 388.06, 406.03; 381/17, 66, 71.6; 455/41.2, 412.2, 466, 455/404.1, 557, 564; 704/201, 205, 211, 704/233, 251, 254, 275; 714/47.2
  See application file for complete search history.

(56) References Cited

U.S. PATENT DOCUMENTS

| | | | |
|---|---|---|---|
| 5,524,148 A | 6/1996 | Allen et al. | |
| 5,640,512 A * | 6/1997 | Czerwiec | H04N 7/165 348/E17.001 |
| 5,809,463 A * | 9/1998 | Gupta | H04B 3/234 704/226 |

(Continued)

*Primary Examiner* — Gerald Gauthier
(74) *Attorney, Agent, or Firm* — Womble Bond Dickinson (US) LLP

(57) ABSTRACT

A method for controlling a speech enhancement process in a far-end device, while engaged in a voice or video telephony communication session over a communication link with a near-end device. A near-end user speech signal is produced, using a microphone to pick up speech of a near-end user, and is analyzed by an automatic speech recognizer (ASR) without being triggered by an ASR trigger phrase or button. The recognized words are compared to a library of phrases to select a matching phrase, where each phrase is associated with a message that represents an audio signal processing operation. The message associated with the matching phrase is sent to the far-end device, which is used to configure the far-end device to adjust the speech enhancement process that produces the far-end speech signal. Other embodiments are also described.

31 Claims, 3 Drawing Sheets

(56) References Cited

U.S. PATENT DOCUMENTS

| | | | |
|---|---|---|---|
| 6,138,100 A * | 10/2000 | Dutton | G10L 15/1822 704/275 |
| 6,560,332 B1 | 5/2003 | Christensson et al. | |
| 7,724,678 B1 * | 5/2010 | Johnsen | H04L 43/50 370/248 |
| 8,971,543 B1 * | 3/2015 | List | H04R 5/02 381/17 |
| 9,060,224 B1 * | 6/2015 | List | G10L 15/08 |
| 9,135,928 B2 | 9/2015 | Dellisanti et al. | |
| 9,380,150 B1 * | 6/2016 | Bullough | H04M 1/72591 |
| 9,837,083 B1 * | 12/2017 | List | G10L 15/08 |
| 9,864,576 B1 * | 1/2018 | Liu | G06F 3/167 |
| 2002/0021798 A1 * | 2/2002 | Terada | H04M 9/10 379/347 |
| 2002/0025832 A1 * | 2/2002 | Durian | B60R 11/0241 455/557 |
| 2002/0032042 A1 * | 3/2002 | Poplawsky | B60R 11/0241 455/564 |
| 2003/0008680 A1 * | 1/2003 | Huh | H04M 1/271 455/557 |
| 2003/0125958 A1 * | 7/2003 | Alpdemir | G06Q 30/02 704/275 |
| 2004/0086107 A1 * | 5/2004 | Hodges | H04B 3/20 379/388.06 |
| 2005/0004796 A1 | 1/2005 | Trump et al. | |
| 2008/0086301 A1 * | 4/2008 | Tachibana | G10L 21/0208 704/201 |
| 2008/0177534 A1 * | 7/2008 | Wang | H04M 3/002 704/211 |
| 2009/0248415 A1 * | 10/2009 | Jablokov | G10L 15/30 704/251 |
| 2011/0116620 A1 | 5/2011 | Gunn et al. | |
| 2012/0016669 A1 * | 1/2012 | Endo | G10L 21/038 704/205 |
| 2014/0064508 A1 * | 3/2014 | Su | H03G 3/3089 381/71.6 |
| 2014/0273979 A1 * | 9/2014 | Van Os | H04M 3/533 455/412.2 |
| 2014/0278394 A1 * | 9/2014 | Bastyr | G10L 21/0208 704/233 |
| 2014/0278423 A1 * | 9/2014 | Dellisanti | G10L 25/60 704/254 |
| 2015/0094105 A1 * | 4/2015 | Pan | H04W 4/12 455/466 |
| 2015/0237185 A1 * | 8/2015 | Theverapperuma | H04W 4/80 455/41.2 |
| 2016/0150315 A1 * | 5/2016 | Tzirkel-Hancock | H04R 3/005 381/66 |
| 2016/0275961 A1 | 9/2016 | Yu et al. | |
| 2016/0379633 A1 | 12/2016 | Lehman et al. | |
| 2017/0078463 A1 | 3/2017 | Bullough et al. | |
| 2017/0085696 A1 * | 3/2017 | Abkairov | H04M 1/7255 |
| 2017/0171380 A1 * | 6/2017 | Singh | H04M 3/002 |
| 2017/0366266 A1 * | 12/2017 | Coli | H04B 10/0779 |
| 2019/0066710 A1 * | 2/2019 | Bryan | G10L 21/0205 |
| 2019/0156847 A1 * | 5/2019 | Bryan | G10L 21/0205 |

* cited by examiner

TRANSPARENT NEAR-END USER CONTROL OVER FAR-END SPEECH ENHANCEMENT PROCESSING

CROSS-REFERENCE TO RELATED APPLICATION

The present application is a continuation-in-part of U.S. patent application Ser. No. 15/688,455 filed on Aug. 28, 2017.

INCORPORATION BY REFERENCE

The disclosure and figures of U.S. patent application Ser. No. 15/688,455, which was filed on Aug. 28, 2017, are hereby incorporated by reference as if set forth in their entireties.

FIELD

An embodiment of the invention relates to digital signal processing techniques for enhancing a received downlink speech signal during a voice or video telephony communication session. Other embodiments are also described.

BACKGROUND

Communication devices such as cellular mobile phones and desktop or laptop computers that are running telephony applications allow their users to conduct a conversation through a two-way, real-time voice or video telephony session that is taking place in near-end and far-end devices that are coupled to each other through a communication network. An audio signal that contains the speech of a near-end user that has been picked up by a microphone is transmitted to the far-end user's device, while, at the same time, an audio signal that contains the speech of the far-end user is being received at the near-end user's device. But the quality and intelligibility of the speech reproduced from the audio signal is degraded due to several factors. For instance, as one participant speaks, the microphone will also pick up other environmental sounds (e.g., ambient noise). These sounds are sent along with the participant's voice, and when heard by the other participant the voice may be muffled or unintelligible as a result. Sounds of other people (e.g., in the background) may also be transmitted and heard by the other participant. Hearing several people talking at the same time may confuse and frustrate the other participant that is trying to engage in one conversation at a time.

Speech enhancement using spectral shaping, acoustic echo cancellation, noise reduction, blind source separation and pickup beamforming (audio processing algorithms) are commonly used to improve speech quality and intelligibility in telephony devices such as mobile phones. Enhancement systems typically operate, for example in a far-end device, by estimating the unwanted background signal (e.g., diffuse noise, interfering speech, etc.) in a noisy microphone signal captured by the far-end device. The unwanted signal is then electronically cancelled or suppressed, leaving only the desired voice signal to be transmitted to the near-end device.

In an ideal system, speech enhancement algorithms perform well in all scenarios and provide increased speech quality and speech intelligibility. In practice, however, the success of enhancement systems varies depending on several factors, including the physical hardware of the device (e.g., number of microphones), the acoustic environment during the communication session, and how a mobile device is carried or being held by its user. Enhancement algorithms typically require design tradeoffs between noise reduction, speech distortion, and hardware cost (e.g., more noise reduction can be achieved at the expense of speech distortion).

SUMMARY

An embodiment of the invention is a process that gives a near-end device the ability to control a speech enhancement process that is being performed in a far-end device, in a manner that is automatic and transparent to both the near-end and far-end users, during a telephony session. The process induces changes to a speech enhancement process that is running in the far-end device, based on determining the needs or preferences of the near-end user in a manner that is transparent to the near-end user. The speech enhancement process is controlled by continually monitoring and interpreting the phrases that are being spoken by the near-end user during the conversation; phrases that describe or imply a lack of quality or a lack of intelligibility in the speech of the far-end user are mapped to pre-determined control signals which are adjustments that can be made to the speech enhancement process that is running in the far-end device. These are referred to here as "hearing problem phrases", and are in contrast to "commands" spoken by the near-end user that would be understood by a virtual personal assistant (VPA), for example as being explicitly directed to raise the volume or change an equalization setting. A command may be a phrase that follows an automatic speech recognizer (ASR) trigger, where the latter may be a phrase which must be spoken by the user, or a trigger button that has to be actuated by the user, to inform the VPA that the ASR should be activated in order to recognize the ensuing speech of the user as instructing the VPA to perform a task. For example, an explicit command may be "Hey Hal, can you reduce the noise that I'm hearing." Once the trigger phrase "Hey Hal" is recognized, the VPA would know to process the immediately following phrase as a potentially recognizable command. In contrast, an embodiment of the invention modifies the VPA so that separate from the usual trigger phrase (e.g., "Hey Hal") the VPA can now detect any one of several, predefined hearing problem phrases which are directly mapped through a lookup table to respective adjustments that are to be made to the speech enhancement process that is running in the far-end device. Examples of such hearing problem phrases include "I can't hear you." "Can you say that again?" "It sounds really windy where you are." and "What?" or "Huh?"

The process may be as follows. While engaged in a real-time, two-way audio communication session (a voice-only telephony session or a video telephony session), a near-end device is receiving a speech downlink signal from the far-end device that includes speech of the far-end user as well as unwanted sounds (e.g., acoustic noise in the environment of the far-end user). A transducer (e.g., loudspeaker) of the near-end device converts the speech downlink signal into sound. Hearing that this sound contains the far-end user's speech but also unwanted sound, e.g., the far-end user's speech sounds muffled, the near-end user may make a comment to the far-end user about the problem (e.g., "I am having trouble hearing you." or "Hello? Hello?") This comment is picked up by a microphone of the near-end device as part of the near-end user's normal conversational speech; the near-end device is of course producing a speech uplink signal from this microphone signal, which is being transmitted to the far-end device.

The speech uplink signal is being continually monitored by a detection process, which is running in the near-end device. The detection process is able to automatically (without being triggered to do so, by a trigger phrase or by a button press) recognize words in the speech uplink signal, using an automatic speech recognizer (ASR) that is running in the near-end device, which analyzes the speech uplink signal to find (or recognize) words therein. The recognized words are then provided to a decision processor, which determines whether a combination of one or more recognized words, e.g., "What?" can be classified as a hearing problem phrase that "matches" a phrase in a stored library of hearing problem phrases.

Each matching phrase within the library is associated with one or more messages or control signals that represents an adjustment to an audio signal processing operation (e.g., a noise reduction process, a reverberation suppression process, an automatic gain control, AGC, process) performed by a speech enhancement process in the far-end device. Once a matching phrase is found, its associated control signal is signaled (by the decision processor) to a communication interface in the near-end device, which then transmits a message containing the control signal to the far-end device. When the message is received and interpreted by a peer process running in the far-end device, it causes a speech enhancement process that is running in the far-end device (and that is producing the received speech downlink signal) to be re-configured according to the content of the message. This adjustment is expected to improve the quality of the speech that is being reproduced in the near-end device (from the speech downlink signal that is being received).

Note that the decision processor is generally described here as "comparing" one or more recognized words to "a library of phrases" that may be stored in local memory of the near-end device, to select a "matching phrase" that is associated with a respective message or target control signal. The operations performed by the decision processor however need not be limited to a strict table look up that finds a matching entry, that contains the phrase that is closest to a given recognized phrase; the process performed by the decision processor may be as complex as a machine learning algorithm that is part of an always-listening short vocabulary voice recognition solution. As an example, the decision processor may have a deep neural network that has been trained (for example in a laboratory setting) with several different hearing problem phrases as its input features, to produce a given target or message that indicates a particular adjustment to be performed upon a speech enhancement process. The neural network can be trained to produce one or more such targets or messages in response to each update to its input feature, each target being indicative of a different adjustment to be performed upon the speech enhancement process.

In another embodiment, the decision processor further determines the content of the message that it sends to the far-end device based on information contained in an incoming message that it receives from the far-end device. For example, the incoming message may identify one or more talkers that are participating in the communication session. In response, the message sent to the far-end device could further indicate that blind source separation be turned on and that a resulting source signal of the talker who was identified in the incoming message be attenuated (e.g., because the near-end user would prefer to listen to another talker.)

In yet another embodiment, one or both of near-end user information and a general audio scene classification of the acoustic environment of the near-end device could help the decision processor make a more informed decision on how to improve the near-end listening experience (by controlling the far-end audio processing via the message content.) For example, the processor may determine near-end user information by i) determining how the near-end user is using the near-end device, such as one of handset mode, speakerphone mode, or headset mode, or ii) custom measuring a hearing profile of the near-end user. The content of the message in that case may be further based on such near-end user information.

In another embodiment, the processor may determine a classification of the acoustic environment of the near-end device, by i) detecting a near-end ambient acoustic noise level, ii) detecting an acoustic environment type as in a car, iii) detecting the acoustic environment type as in a restaurant, or iv) detecting the acoustic environment type as a siren or emergency service in process. The content of the message in that case is further based on such classification of the acoustic environment of the near-end device.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

DETAILED DESCRIPTION

Figure 1:
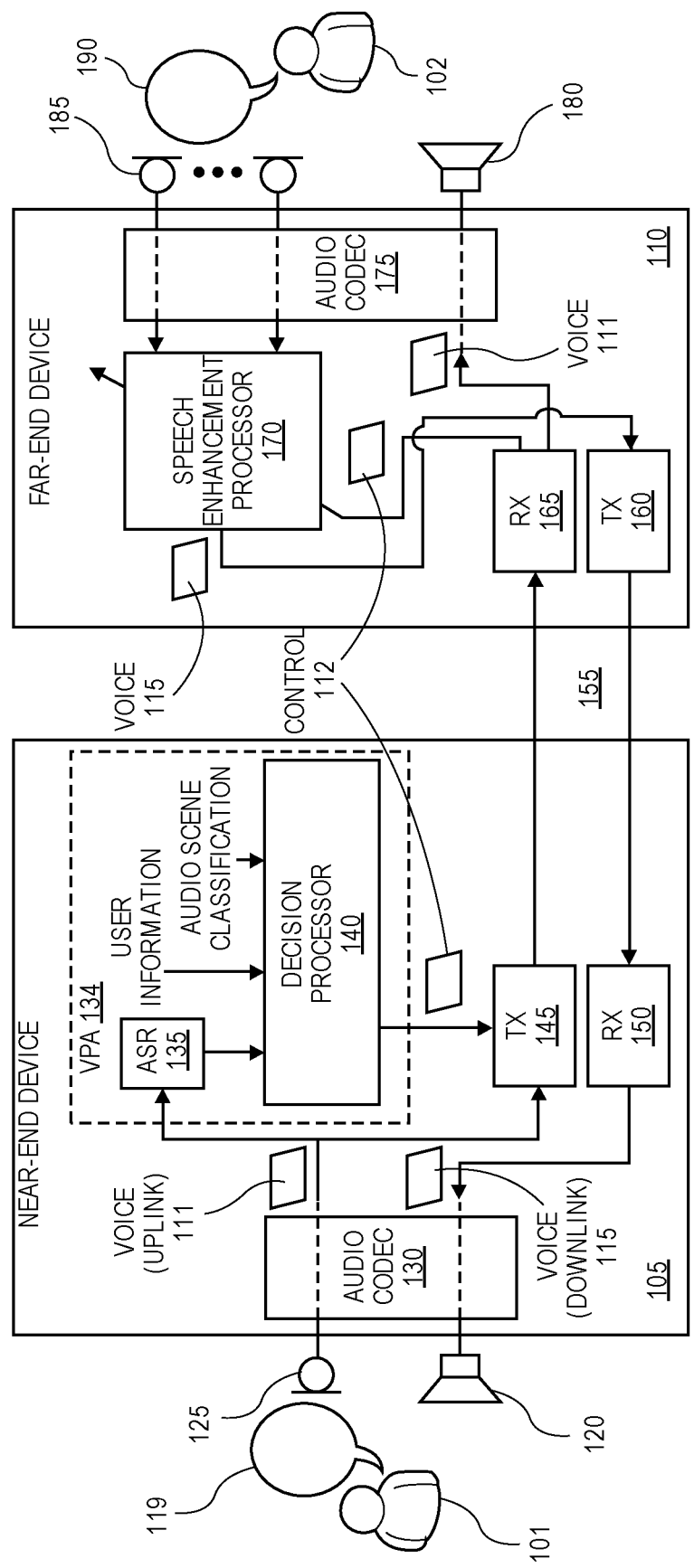
FIG. 1 is a block diagram of a near-end device engaged in a telephony communication session over a communication link with a far-end device.

Several embodiments of the invention with reference to the appended drawings are now explained. Whenever the shapes, relative positions and other aspects of the parts described in the embodiments are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

As described below, one aspect of the present technology is the gathering and use of data, such as spoken phrases by a user during a telephone conversation, to give a near-end device the ability to control a speech enhancement process that is performed in a far-end device, in a manner that is automatic and transparent to both the near-end and far-end users. The present disclosure recognizes that the use of such data, e.g., specific spoken phrases, in the present technology, can be used to the benefit of users, e.g., for speech enhancement during a telephony session.

The present disclosure contemplates that those entities responsible for the collection, analysis, disclosure, transfer, storage, or other use of such data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of data should be prominent and easily accessible by users, and should be updated as the collection and/or use of data changes. It is generally not the intent of the present technology to gather specific personal information, such as personal information data that may uniquely identify or can be used to identify a specific person, from users; however, to the extent that any personal information is collected, such information is used for legitimate purposes only.

Further, collection of data should occur only after receiving the consent of the users or other legitimate basis specified in applicable law. Additionally, such entities should consider taking any needed steps for safeguarding and securing access to data and ensuring that others with access to the data adhere to their privacy policies and procedures. Further still, such entities can subject themselves to evaluation by third parties to certify their adherence to widely accepted privacy policies and practices. In addition, policies and practices should be adapted for the particular types of data being collected and/or accessed and adapted to applicable laws and standards, including jurisdiction-specific considerations that may serve to impose a higher standard. For example, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users can selectively block the use of, or access to, data. That is, the present disclosure contemplates that hardware and/or software elements can be provided to prevent or block access to select portions of data. Moreover, it is the intent of the present disclosure that data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of data to implement one or more various disclosed embodiments, e.g., user spoken phrases for a speech enhancement purposes, the present disclosure contemplates that the various embodiments can also be implemented without the need for accessing select portions of data. That is, the various embodiments of the present technology are not rendered inoperable due to the lack of all or a portion of data.

FIG. 1 shows a near-end device 105 engaged in a telephony communication session over a communication link 155 with a far-end device 110. Specifically, this figure shows near-end device 105 capturing speech 119 spoken by a near-end user 101, referred to here as a speech (voice) uplink signal 111, which is transmitted by a transmitter, Tx, 145 of a communication interface of the near-end device 105, over a communication link 155, before being received by a receiver, Rx, 165 of a communication interface of the far-end device 110; it is then ultimately output as sound via an audio codec 175 and a sound output transducer 180, for the far-end user 102 to hear. The near-end device 105 includes a microphone 125, a transducer 120, an audio codec 130, a virtual personal assistant system, VPA 134, a transmitter, Tx 145, and a receiver, Rx 150. The microphone 125 is positioned towards the near-end user 101, in order to pick up speech 119 of the near-end user 101 as an analog or digital speech (voice) signal. Note that the near-end device may have more than one microphone whose signals may be combined to perform spatially selective sound pickup, to produce a single, speech or voice (uplink) signal 111. Also, the microphone 125 and the transducer 120 need not be in the same housing; for example, the transducer 120 may be built into a laptop computer housing while the microphone 125 is in a wireless headset (that is communicating with the laptop computer).

Similarly, speech 190 by the far-end user 102 is captured by a microphone 185, as a speech or voice (downlink) signal 115, which is transmitted by a transmitter, Tx 160 over the communication link 155 before being received by the receiver, Rx 150 in the near-end device 105; it is then ultimately output as sound via the audio codec 130 and the sound output transducer 120, for the near-end user 101 to hear. Note here that the far-end user speech downlink signal 115 is produced by a speech enhancement processor 170 that performs a speech enhancement process upon it (prior to transmission), in accordance with a control or target signal, message 112, that was sent from the near-end device 105 (as explained in more detail below).

Although shown as conducting a voice-only telephony communication session, the near-end and far-end devices may also be capable of conducting a video telephony communication session (that includes both audio and video at the same time). For instance, although not shown, each device may have integrated therein a video camera that can be used to capture video of the device's respective user. The videos are transmitted between the devices, and displayed on a touch sensitive display screen (not shown) of the devices. The devices 105 and 110 may be any computing devices that are capable of conducting a real-time, live audio or video communication session (also referred to here as a telephony session). For example, either of the devices may be a smartphone, a tablet computer, a laptop computer, smartwatch, or a desktop computer.

The audio codec 130 may be designed to perform encoding and decoding, and/or signal translation or format conversion operations, upon audio signals, as an interface between the microphone 125 and the sound output transducer 120 on one side, and a communications interface (Tx 145 and Rx 150) and the VPA 134 on another. The audio codec 130 may receive a microphone signal from the microphone 130 and converts the signal into a digital speech (voice) uplink signal 111. The audio codec 130 may also receive the digital speech (voice) downlink signal 115, which was transmitted by the far-end device 110, and converts it into an audio or digital transducer driver signal that causes the transducer 120 to re-produce the voice of the far-end user. A similar description applies to the audio codec 175 that is in the far-end device.

The VPA 134 continuously monitors the speech uplink signal 111, to detect whether the near-end user 101 is saying a hearing problem phrase which implies that a speech enhancement process performed at the far-end device 110 should be adjusted. The VPA may continuously monitor the entirety or at least a portion of the telephony session between the near-end device 105 and the far-end device 110. The VPA 134 is always-on (during the telephony session) and monitors the speech signal 111 to detect the hearing problem phrases during "normal conversation". In other words, the hearing problem phrases are not immediately preceded with a VPA trigger phrase (e.g., "Hey Hal") or trigger button actuation, which may be used to inform the VPA that the user is going to command (or instruct) the VPA to perform a particular task. Example hearing problem phrases may include "I can't hear you," or "Can you say that again?" or "It sounds really windy where you are." From these implicit phrases, the VPA may determine how to control the speech enhancement process, as described below.

The VPA system 134 may include an automatic speech recognizer (ASR) 135 and a decision processor 140. The ASR 135 is to receive the speech uplink signal 111 and analyze it to recognize the words in the speech 119 by the near-end user 101. The ASR 135 may be "always-on", continuously analyzing the speech signal 111 during the entirety or at least a portion of the communication session, to recognize words therein. The recognized words are processed by the decision processor 140, to detect hearing problem phrases within the recognized speech from the ASR 135. The decision processor 140 may retrieve a message 112 (also referred to here as a target control signal or target control data) associated with a detected hearing problem phrase.

The message 112 represents a manipulation to at least one control parameter of an audio signal processing operation (or algorithm) performed by the speech enhancement processor 170 in the far-end device 110. The message 112, as will be described later in detail, may be repeatedly updated over time several times during a telephony session, and each update may be transmitted to the far-end device 110 in order to smoothly control or adapt the speech enhancement processor 170 in the far-end device 110 to the hearing needs of the near-end user. A process running in the far-end device, performed by the speech enhancement processor 170, interprets the received message 112 for example using a predetermined, locally stored lookup table; the look up table may map one or more different codes that may be contained in the message 112 into their corresponding adjustments that can be made to the speech enhancement process being performed in the far-end device. Such adjustments may include activation of a particular audio signal processing operation, its deactivation, or an adjustment to the operation. The adjustment to the specified audio signal processing operation is then applied, by accordingly re-configuring the speech enhancement processor 170 that is producing the far-end user downlink speech signal 115.

Returning to the near-end device, in order to detect a hearing problem phrase, the decision processor 140 may compare the recognized words (from the ASR 135) to a library of phrases, to select a matching phrase. The library may include a lookup table (which is stored in memory) that includes a list of pre-stored phrases and messages, with each stored phrase being associated with a respective message. For example, the pre-stored phrase "I can't hear you", or "Can you talk louder" may have an associated message that represents a manipulation of a control parameter of an automatic gain control (AGC) process. Specifically, the change to the control parameter may activate the AGC process, or indicate that a target level of the AGC process be changed (e.g., increased). Alternatively, this pre-stored phrase may have a different associated message, one that changes a control parameter of a noise reduction filter or process, e.g., a cut-off frequency, a noise estimation threshold, or a voice activity detection threshold. For instance, since the phrase "I can't hear you" or "Can you say that again?" may mean (implicitly) that there is too much background noise; the phrase may be associated with an adjustment to a noise reduction process (e.g., increase the aggressiveness of the noise reduction process).

Another pre-stored phrase may be, "Your voice sounds weird" which could imply that a noise reduction filter is too aggressive and is inducing audible artifacts. In that case, the associated message may be to deactivate the noise reduction filter, or if the filter is already active reduce its performance to lessen the chance of speech distortion.

Another pre-stored phrase may be "It sounds really windy where you are." This phrase may be associated with a message 112 that adjusts a control parameter to a wind noise suppression process. In particular, the adjustment may activate the wind noise suppression process, or it may change how aggressively the wind noise suppression process operates (e.g., increases it, in order to reduce the wind noise). A deactivation of the wind noise suppression algorithm may be called for when the detected phrase is similar to, "Your voice sounds strange or unnatural."

Yet another pre-stored phrase may be "It sounds like you're in a cathedral." In this situation, the far-end user may sound like they are in a large reverberant room, due to a presence of large amount of reverberation in their speech signal. Therefore, this phrase may be associated with an adjustment to a reverberation suppression process. In particular, the adjustment to the control parameter may activate the reverberation suppression process, or if the process is already active, the adjustment to the control parameter may increase the aggressiveness of the reverberation suppression process.

In one embodiment, one of the pre-stored hearing problem phrases may be associated with a message 112 that activates a blind source separation algorithm (BSS) performed by the speech enhancement processor 170. The BSS algorithm tries to isolate two or more sound sources that have been mixed into a single-channel or multi-channel microphone pickup (where multi-channel microphone pickup refers to outputs from multiple microphones, in the far-end device 110.) For example, there may be a pre-stored phrase, "I can't hear you because there are people talking in the background." The associated message could indicate that BSS be turned on.

In another embodiment, the associated message 112 could indicate an adjustment to the characteristics of a pickup beam pattern (assuming a microphone array beamforming processor in the far-end device 110 has been turned on), which is to change the direction of a main pickup lobe of the beam pattern; the goal here may be to, for example through trial and error, reach a pickup beam direction that is towards the far-end user 102 (and consequently away from other talkers in the background). In another embodiment, since the sound of people talking in the background may be considered unwanted background noise, the associated message may indicate a change in how aggressively a directional noise reduction process should be operating (e.g., an increase in its aggressiveness), in order to reduce the background noise.

Note that a given message 112 (its content) may refer to more than one audio signal processing operation that is to be adjusted in the far-end device. For example, a single message 112 may indicate both an increase in the aggressiveness of a noise reduction filter and the activation of BSS. Also, more than one different hearing problem phrases may be associated with the same message 112. For example, all three of these phrases may be associated with the same message 112, "I can't hear you." "It's too noisy there." "I can barely hear you." Also, a recognized phrase need not be exactly the same as its selected "matching phrase"; the comparison operation may incorporate a sentence similarity algorithm (e.g. using a deep neural network or other machine-learning algorithm) that computes how close a recognized phrase is to a particular pre-stored phrase in the library, and if sufficiently close (higher than a predetermined threshold, such as a likelihood score or a probability) then the matching phrase is deemed found.

In addition to choosing which audio signal processing operation is to be adjusted, as indicated in the message 112 that is associated with the matching phrase, the decision processor 140 may also separately decide how much the audio signal processing operation is to be adjusted. For example, the degree of adjustment (which may also be indicated in the message 112) may be based on whether other speech enhancement operations have already been adjusted during a recent time interval (in the same telephony session). Alternatively, the degree of adjustment need not be indicated in the message 112, because it would be determined by the speech enhancement processor 170 (at the far-end device 110.)

The decision processor 140 may decide to change from the "default" audio signal processing operation to a different one, when it has detected the same hearing problem phrase more than once. As an example, the decision processor may detect that the near-end user repeatedly says the same hearing problem phrase, e.g., "I can't hear you." during a certain time interval. For the first or second time that the decision processor 140 detects this phrase, it may transmit a message to the far-end device to change (e.g., increase) the AGC process (the default operation.) If additional instances of that phrase are detected, however, the decision processor 140 may decide to adjust a different operation (e.g., adjusting performance of the noise reduction filter). In this way, the decision processor 140 need not rely upon a single or default adjustment that doesn't appear to be helping the near-end user 101. In another embodiment, the decision processor 140 may make its decision, as to which control parameter of an audio signal processing operation to adjust, based on a prioritized list of operations, for each hearing problem phrase. For example, in response to the first instance of a hearing problem phrase, the decision processor may decide to adjust an audio signal processing operation that has been assigned a higher priority, and then work its way down the list in response to subsequent instances of the hearing problem phrase.

Note that although the decision processor 140 is generally described here as "comparing" several recognized words to "a library of phrases" that may be stored in local memory of the near-end device, to select a "matching phrase" that is associated with a respective "message" or target, the operations performed by the decision processor need not be limited to a strict table look up that finds the matching entry, being one whose phrase is closest to a given recognized phrase; the process performed by the decision processor 140 may be as complex as a machine learning algorithm that is part of an always-listening short vocabulary or short phrase voice recognition solution. As an example, the decision processor may have a deep neural network that has been trained (for example, in a laboratory setting) with several different hearing problem phrases as its input features, to produce a given target or message that indicates a particular adjustment to be performed upon a speech enhancement process. The neural network can be trained to produce two or more such targets or messages, each being indicative of a different adjustment to be performed upon the speech enhancement process.

In another embodiment of the invention, the decision processor 140 makes its decision (as to which message 112 or control signal should be sent to the far-end device 110 based on having found a matching, hearing problem phrase) based on the context of the conversation between the near-end user 101 and the far-end user 102. Information on such context may be obtained using incoming messages that are received from a peer process that is running in the far-end device. For example, a sound field picked up by a microphone array (two or more microphones 185 in the far-end device 110) may contain several talkers, including the far-end user 102. In one embodiment, the peer process running in the far-end device 110 may be able to identify the voices of several talkers including that of the far-end user 102, e.g., by comparing the detected speech patterns or signatures to find those that match with a pre-stored speech pattern or signature, or generally referred to here as performing a speaker recognition algorithm. Once the talkers are identified, e.g., a talker "Frank" who owns the far-end device or is its primary user, and another talker "Heywood", the process in the far-end device 110 sends such identification data to a peer process that is running in the near-end device 105 (e.g., being performed by the decision processor 140). In other words, an incoming message from the far-end device identifies one or more talkers that are participating in the communication session. The decision processor 140 may then use this speaker identification data in deciding how to control the speech enhancement process in the far-end device. For instance, the decision processor 140 may detect a hearing problem phrase from the near-end user 101 as part of, "Heywood, I'm trying to listen to Frank. Can you please be quiet?" In response to receiving an incoming message from the far-end device which states that two talkers have been identified as Heywood and Frank, the decision processor 140 may decide to send to its peer process in the far-end device a message (e.g., part of the message 112) that indicates that BSS be turned on and that the sound source signal associated with Heywood be attenuated.

A message 112 produced by the decision processor 140 may be sent to a peer process that is performed by a speech enhancement processor 170 in the far-end device 110, as follows. In one embodiment, still referring to FIG. 1, the transmitter 145 embeds the message 112 into the digital speech uplink signal 111 for transmission to the far-end device 110 over the communication link 155, by processing the message using audio steganography to encode the message into the near-end user speech uplink signal. In another embodiment, the message 112 is processed into a metadata channel of the communication link 155 that is used to send the near-end user speech uplink signal to the far-end device.

In both cases, the message 112 is inaudible to the far-end user, during playback of the near-end user speech uplink signal.

In one embodiment, a carrier tone that is acoustically not noticeable to the average human ear may be modulated by the message 112 and then summed or otherwise injected into or combined with the near-end user speech uplink signal 111. For example, a sinusoidal tone having relatively low amplitude at a frequency that is at or just beyond the upper or lower hearing boundary of the audible range of 20 Hz to 20 kHz for a human ear, may be used as the carrier. A low amplitude, sinusoidal carrier tone that is below 20 Hz or above 15 kHz is likely to be unnoticeable to an average human listener, and as such the near-end user speech uplink signal that contains such a carrier tone can be readily played back at the far-end device without having to be processed to remove the carrier tone.

The frequency, phase and/or amplitude of the generated carrier signal may be modulated with the message 112 or the control signal in the message, in different ways. For instance, a stationary noise reduction operation may be assigned to a tone having a particular frequency, while its specific parameter (e.g., its aggressiveness level) are assigned to different phases and/or different amplitudes of that tone. As another example, a noise reduction filter may be assigned to a tone having a different frequency. In this way, several messages 112 or several control signals may be transmitted to the far-end device 110, within the same audio packet or frame of the uplink speech signal.

The library of messages 112 stored in the near-end device may be developed for example in a laboratory setting in advance, and then stored in each production specimen of the device. The messages may encompass changes to several parameters of audio signal processing operations (or algorithms) that can be performed by the speech enhancement process in the far-end device. Examples include: the cutoff frequency or other parameter of a noise reduction filter, whether wind-noise suppression is activated and/or its aggressiveness level, whether reverberation suppression is activated and/or its aggressiveness level, and automatic gain control. If the far-end device has a beamforming microphone array that is capable of creating and steering pickup (microphone) beam patterns, then the library of messages may include messages that control the directionality, listening direction, and width of the beam patterns. Another possible message may be one that activates, deactivates, or makes an adjustment to a BSS (that can be performed by the speech enhancement process in the far-end device). Specifically, the near-end device may control whether one or more sound sources detected by the BSS algorithm running in the far-end device are to be amplified or whether they are to be attenuated. In this way, the message may result in a background voice being suppressed in order to better hear a foreground voice which may be expected in most instances to be that of the far-end user.

Figure 2:
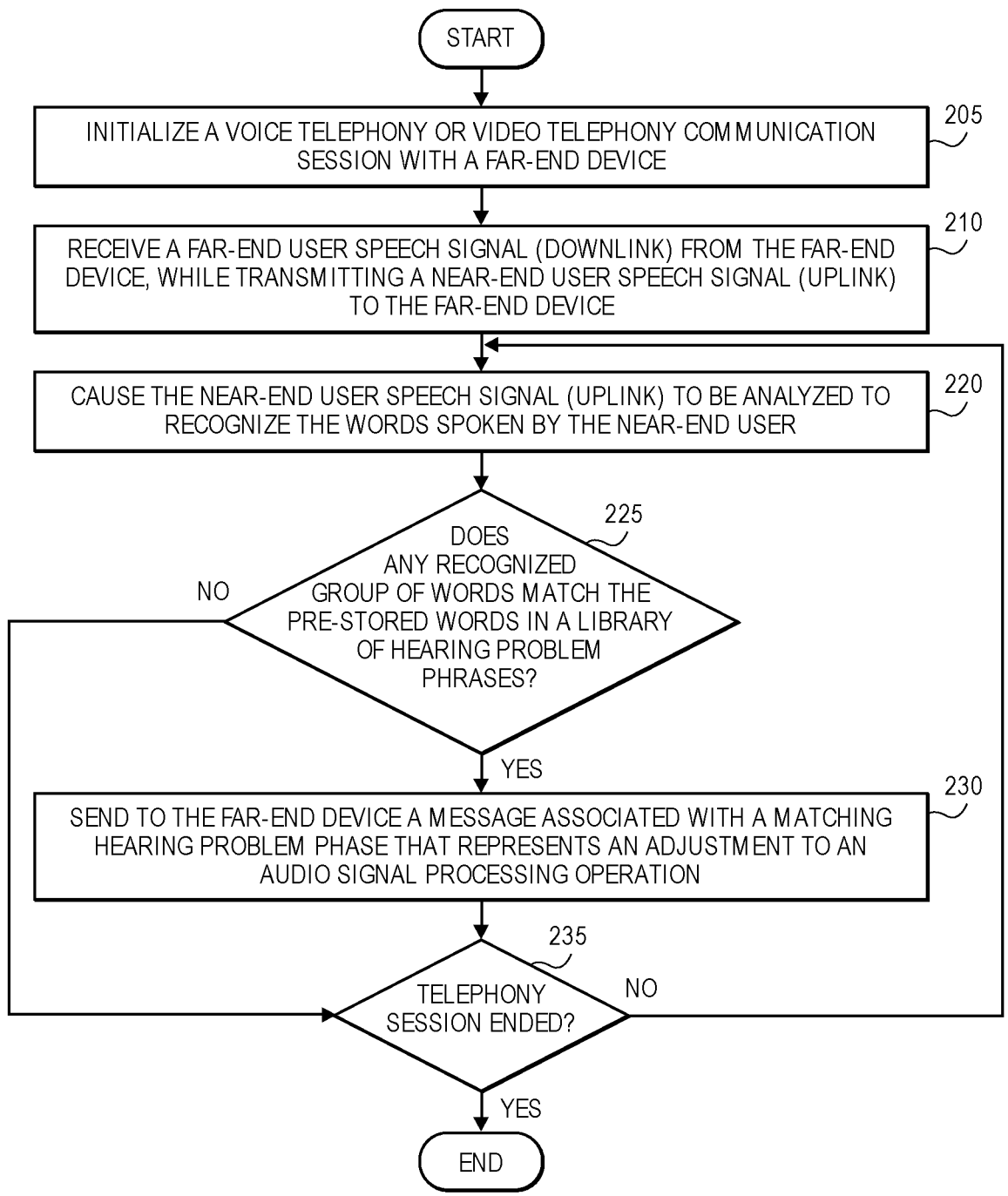
FIG. 2 is a flowchart of one embodiment of a process for the near-end device to transmit a message to control the far-end device.

FIG. 2 is a flow diagram of operations in a speech enhancement method that may be performed in a near-end device, for controlling a speech enhancement process that is being performed in a far-end device, while the near-end device is engaged in a voice telephony or video telephony communication session over a communication link with the far-end device. The voice or video telephony session is initialized for example using Session Initiation Protocol, SIP (operation 205). When a connection is established with the far-end device, a near-end user speech uplink signal is produced, using a microphone in the near-end device to pick up speech of a near-end user. During the telephony session, the near-end user speech uplink signal is transmitted to the far-end device, while a far-end user speech downlink signal is being received from the far-end device (operation 210), enabling a live or real time, two-way communication between the two users. During the telephony session, the method causes the near-end user speech uplink signal to be analyzed by an ASR, without being triggered by an ASR trigger phrase or button, where the ASR recognizes the words spoken by the near-end user (operation 220). The ASR may be a processor of the near-end device that has been programmed with an automatic speech recognition algorithm that is resident in local memory of the near-end device, or it may be part of a server in a remote network that is accessible over the Internet; in the latter case, the near-end user speech uplink signal is transmitted to the server for analysis by the ASR, and then the words recognized by the ASR are received from server. In either case, a resulting stream of recognized words may be compared to a stored library of hearing problem phrases (operation 225), with the ASR and comparison operations repeating so long as the telephony session has not ended (operation 235). Each phrase of the library may be associated with a respective message that represents an adjustment to one or more audio signal processing operations performed in the far-end device. When a matching phrase is found and selected, a message that is associated with the matching phrase is then sent to the far-end device (operation 230). The message, once received and interpreted in the far-end device, configures the far-end device to adjust a speech enhancement process that is producing the far-end user speech downlink signal.

Figure 3:
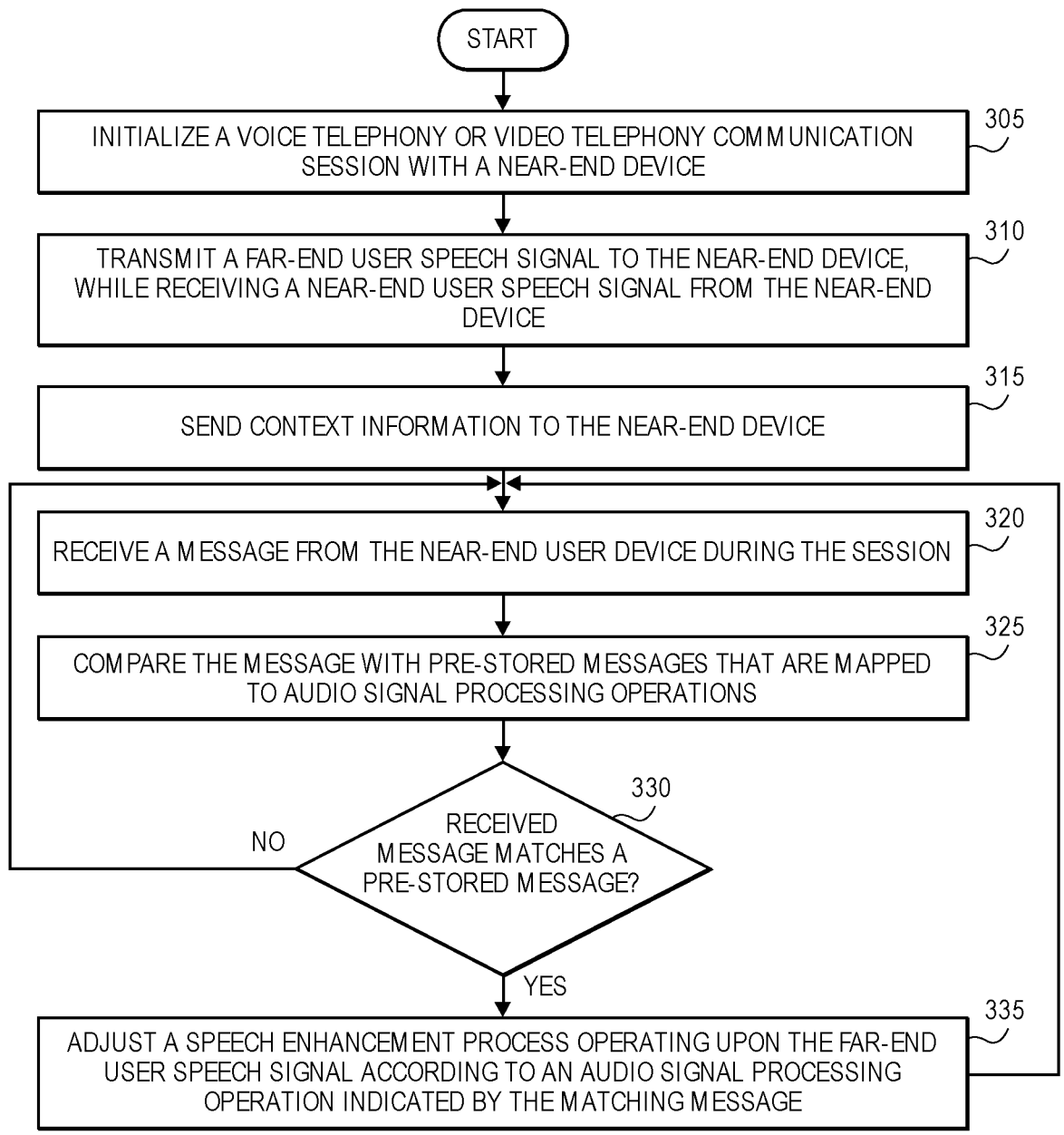
FIG. 3 is a flowchart of one embodiment of a process to adjust a speech enhancement process being performed in the far-end device, based on receiving the message.

FIG. 3 is a flow diagram of operations of the method described above, that are performed in the far-end device. After initialization of the telephony session with the near-end device (operation 305), the telephony session begins once a connection has been established with the near-end device, such that the far-end user speech signal is produced and transmitted to the near-end device while receiving the near-end user speech signal (operation 310). The following operations 320-335 are then performed during the session. A message is received from the near-end user device (operation 320), which is compared with previously stored messages that have been mapped to audio signal processing operations that are available in the far-end device, for speech enhancement processing of the far-end user speech signal (operation 325). If the received message matches a pre-stored message (operation 330), then the speech enhancement process that is producing the far-end user speech signal is adjusted accordingly (operation 335). The operations 320-335 may be repeated each time a new message is received during the telephony session, thereby updating the speech enhancement process according to the subjective feedback given by the near-end user in a manner that is transparent to both the near-end and far-end users.

In another embodiment, still referring to the flow diagram of FIG. 3, information on the context of the conversation between the near-end user 101 and the far-end user 102 is determined by a process running in the far-end device, and messages that contain such information are then sent to a peer process that is running in the near-end device (operation 315). As described above, this enables the decision processor 140 in the near-end device to better control certain types of audio signal processing operations, such as BSS.

To help the decision processor make a more informed decision on how to improve the near-end listening experience (by controlling the far-end audio processing via the message content), the following embodiments are available.

As seen in FIG. 1, in one embodiment, memory within the near-end device 105 has further instructions stored therein that when executed by a processor determine near-end user information, which is shown as a further input to the decision processor 140. The determined near-end user information may be i) how the near-end user is using the near-end device, as one of handset mode, speakerphone mode, or headset mode, or ii) a custom measured hearing profile of the near-end user. The decision processor 140 may then produce the content of the message that is sent to the far-end device, further based on such near-end user information.

In another embodiment, the memory has further instructions stored therein that when executed by the processor determine a classification of the acoustic environment of the near-end device—this is labeled in FIG. 1 as "audio scene classification" as a further input to the decision processor 140. For example, the classification may be determined by i) detecting a near-end ambient acoustic noise level, ii) detecting an acoustic environment type as in a car, iii) detecting the acoustic environment type as in a restaurant, or iv) detecting the acoustic environment type as a siren or emergency service in process. The decision processor 140 may then produce the content of the message that is sent to the far-end device, further based on such audio scene classification.

As previously explained, an embodiment of the invention may be a non-transitory machine-readable medium (such as microelectronic memory) having stored thereon instructions which program one or more data processing components (generically referred to here as a "processor") to perform the digital signal processing operations described above, for instance in connection with the flow diagrams of FIG. 2 and FIG. 3. In other embodiments, some of these operations might be performed by specific hardwired logic components such as a dedicated digital filter blocks and state machines. Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, the terms "near-end" and "far-end" are used to more easily understand how the various operations may be divided across any two given devices that are participating in a telephony session, and are not intended to limit a particular device or user as being on one side of the telephony session versus the other; also, it should be recognized that the operations and components described above in the near-end device can be duplicated in the far-end device, while those described above in the far-end device can be duplicated in the near-end device, so as to achieve transparent far-end user-based control of a speech enhancement process in the near-end device, thereby achieving a symmetric effect that benefits both users of the telephony session. The description is thus to be regarded as illustrative instead of limiting.

What is claimed is:

1. A method performed in a near-end device for controlling a speech enhancement process in a far-end device, while the near-end device is engaged in a voice telephony or video telephony communication session over a communication link with the far-end device, the method comprising:

producing a near-end user speech uplink signal, using a microphone in the near-end device to pick up speech of a near-end user;

transmitting the near-end user speech uplink signal to the far-end device, and receiving a far-end user speech downlink signal from the far-end device;

causing the near-end user speech uplink signal to be analyzed by an automatic speech recognizer (ASR), without being triggered by an ASR trigger phrase or button, to recognize a plurality of words spoken by the near-end user;

processing the recognized plurality of words to determine a message that represents an audio signal processing operation performed in the far-end device; and sending the message to the far-end device, wherein the message configures the far-end device to adjust a speech enhancement process that is producing the far-end user speech downlink signal.

2. The method of claim 1, wherein the message indicates an adjustment to a blind source separation algorithm that operates upon a plurality of microphone signals from a plurality of microphones in the far-end device, which pick up a sound field of the far-end device.

3. The method of claim 1, wherein the message contains a parameter of a noise reduction filter, or a parameter that controls a process that reduces stationary noise.

4. The method of claim 1, wherein the message indicates that a noise reduction filter be deactivated, or that performance or aggressiveness of the noise reduction filter be reduced to lessen a chance of speech distortion.

5. The method of claim 1, further comprising receiving an incoming message from the far-end device that identifies one or more talkers that are participating in the communication session, wherein the message sent to the far-end device further indicates that blind source separation be turned and that a source signal of the talker who was identified in the incoming message be attenuated.

6. The method of claim 1, further comprising processing the message into a metadata channel of a communication link that is used to send the near-end user speech uplink signal to the far-end device.

7. The method of claim 1, further comprising processing the message using audio steganography to embed the message into the near-end user speech uplink signal.

8. The method of claim 1, further comprising transmitting the near-end user speech uplink signal to a server for analysis by the ASR, and then receiving from the server the plurality of words recognized by the ASR.

9. The method of claim 1, wherein processing the recognized plurality of words comprises determining whether the plurality of words matches a phrase in a stored library of phrases, wherein the phrase in the stored library of phrases is associated with one or more messages that represents an adjustment to an audio signal processing operation.

10. The method of claim 1, wherein processing the recognized plurality of words comprises utilizing a machine learning algorithm that is part of an always-listening short vocabulary voice recognition solution to produce one or more messages that represents an adjustment to an audio signal processing operation.

11. The method of claim 1, wherein the ASR is a processor of the near-end device programmed with an automatic speech recognition algorithm that is resident in a memory of the near-end device.

12. A near-end device, comprising:
a communication interface to transmit a near-end user speech uplink signal to a far-end device, and receive a far-end user speech downlink signal from the far-end device;
a microphone;
a processor; and
memory having stored therein instructions that when executed by the processor
produce, while the near-end device is engaged in a voice telephony or video telephony communication session with the far-end device, the near-end user speech uplink signal that contains speech of a near-end user picked up by the microphone,
cause the near-end user speech uplink signal to be analyzed by an automatic speech recognizer (ASR), without being triggered by an ASR triggering phrase or button, to recognize a plurality of words spoken by the near-end user,
process the recognized plurality of words to determine a message that represents an audio signal processing operation performed in the far-end device, and
signal the communication interface to transmit the message to the far-end device, wherein the message configures the far-end device to adjust a speech enhancement process that is producing the far-end user speech downlink signal.

13. The near-end device of claim 12, wherein the message indicates an adjustment to a blind source separation algorithm that operates upon a plurality of microphone signals from a plurality of microphones in the far-end device, which pick up a sound field of the far-end device.

14. The near-end device of claim 12, wherein the message indicates a change in a parameter of a noise reduction filter.

15. The near-end device of claim 12, wherein the message indicates that a noise reduction filter be deactivated, or that performance of the noise reduction filter be reduced to lessen a chance of speech distortion.

16. The near-end device of claim 12, wherein the message indicates that a wind noise suppression process be activated, or that aggressiveness of the wind noise suppression process be changed.

17. The near-end device of claim 12, wherein the message indicates that a reverberation suppression process be activated, or that aggressiveness of the reverberation suppression process be changed.

18. The near-end device of claim 12, wherein the message indicates that an automatic gain control (AGC) process be activated, or that a target AGC level of the process be changed.

19. The near-end device of claim 12, wherein the message indicates a parameter that controls directional noise reduction by a beamforming algorithm that operates upon a plurality of microphone signals.

20. The near-end device of claim 12, wherein the message indicates a change to a pickup beam direction, for a beamforming algorithm that operates upon a plurality of microphone signals.

21. The near-end device of claim 12, wherein the message indicates pickup beam directionality, for a beamforming algorithm that operates upon a plurality of microphone signals.

22. The near-end device of claim 12, wherein the memory has further instructions stored therein that when executed by the processor determine near-end user information, by i) determining how the near-end user is using the near-end device, as one of handset mode, speakerphone mode, or headset mode, or ii) custom measuring a hearing profile of the near-end user, wherein content of the message is further based on said near-end user information.

23. The near-end device of claim 12, wherein the memory has further instructions stored therein that when executed by the processor determine a classification of an acoustic environment of the near-end device, by i) detecting a near-end ambient acoustic noise level, ii) detecting an acoustic environment type as in a car, iii) detecting the acoustic environment type as in a restaurant, or iv) detecting the acoustic environment type as a siren or emergency service in process.

24. The near-end device of claim 12, wherein the ASR is the processor of the near-end device, and wherein the processor is programmed with an automatic speech recognition algorithm resident in the memory of the near-end device.

25. The near-end device of claim 12, wherein the memory has instructions stored therein that when executed by the processor process the recognized plurality of words by determining whether the plurality of words matches a phrase in a stored library of phrases, wherein the phrase in the stored library of phrases is associated with one or more messages that represents an adjustment to an audio signal processing operation.

26. The near-end device of claim 12, wherein the memory has instructions stored therein that when executed by the processor process the recognized plurality of words by utilizing a machine learning algorithm that is part of an always-listening short vocabulary voice recognition solution to produce one or more messages that represents an adjustment to an audio signal processing operation.

27. An article of manufacture, comprising:
a machine-readable medium having instructions stored therein that when executed by a processor of a near-end device
produce, while the near-end device is engaged in a voice telephony or video telephony communication session with a far-end device, a near-end user speech uplink signal that contains speech of a near-end user picked up by a microphone of the near-end device,
cause the near-end user speech uplink signal to be analyzed by an automatic speech recognizer (ASR), without being triggered by an ASR triggering phrase or button, to recognize a plurality of words spoken by the near-end user,
process the recognized plurality of words to determine a message that represents an audio signal processing operation performed in the far-end device, and
signal a communication interface in the near-end device to transmit the message to the far-end device, wherein the message configures the far-end device to adjust a speech enhancement process that is producing a far-end user speech downlink signal.

28. The article of manufacture of claim 27, wherein the machine-readable medium has stored therein a library of phrases that are associated with two or more of the following messages:
a message that indicates an adjustment to a blind source separation algorithm that operates upon a plurality of microphone signals from a plurality of microphones;
a message that i) contains a parameter of a noise reduction filter, ii) indicates that a noise reduction filter be deactivated, or iii) indicates that performance of the noise reduction filter be reduced to lessen a chance of speech distortion;
a message that contains a parameter which governs how aggressively a level of stationary noise is reduced;

a message that indicates that a wind noise suppression process be activated, or that the aggressiveness of the wind noise suppression process be changed;

a message that indicates that a reverberation suppression process be activated, or that the aggressiveness of the reverberation suppression process be changed; and a message that indicates that an automatic gain control (AGC) process be activated, or that a target AGC level of the process be changed.

29. The article of manufacture of claim 27, wherein the machine-readable medium has instructions stored therein that when executed by a processor of a near-end device process the recognized plurality of words further comprises determining whether the plurality of words matches a phrase in a stored library of phrases, wherein the phrase in the stored library of phrases is associated with one or more messages that represents an adjustment to an audio signal processing operation.

30. The article of manufacture of claim 27, wherein the machine-readable medium has instructions stored therein that when executed by a processor of a near-end device process the recognized plurality of words further comprises utilizing a machine learning algorithm that is part of an always-listening short vocabulary voice recognition solution to produce one or more messages that represents an adjustment to an audio signal processing operation.

31. The article of manufacture of claim 27, wherein the ASR is the processor of the near-end device, and wherein the processor is programmed with an automatic speech recognition algorithm that is resident in a memory of the near-end device.

\* \* \* \* \*